United States Patent

[11] 3,597,698

[72] Inventor John Matarese
New City, N.Y.

[21] Appl. No. 839,036
[22] Filed July 7, 1969
[45] Patented Aug. 3, 1971
[73] Assignee General Telephone & Electronics Laboratories Incorporated

[54] INTEGRATABLE GYRATOR
8 Claims, 2 Drawing Figs.

[52] U.S. Cl. ........ 330/63, 330/30 R, 330/24, 330/30 D, 333/80 T
[51] Int. Cl. ........ H03f 9/00, H03f 3/04
[50] Field of Search ........ 330/63, 109, 85; 333/24.1, 80, 80 T

[56] References Cited

UNITED STATES PATENTS

| | | | |
|---|---|---|---|
| 3,001,157 | 9/1961 | Sipress et al. | 333/24.1 X |
| 3,255,364 | 6/1966 | Warner, Jr. | 307/304 |
| 3,300,738 | 1/1967 | Schlicke | 333/24.1 |
| 3,400,335 | 9/1968 | Orchard et al. | 330/24 |

*Primary Examiner*—Nathan Kaufman
*Attorneys*—Robert J. Frank and Amster & Rothstein

ABSTRACT: A two-port gyrator circuit which can be manufactured by standard silicon monolithic techniques, and which nevertheless is capable of simulating an inductor with a high Q-factor at frequencies ranging from DC to 100 kHz. without compensation. With compensation, the gyrator does not become unstable at frequencies as high as 1 MHz. The gyrator is also insensitive to temperature changes and has a large dynamic range. The improved characteristics are achieved with the use of a modified Darlington pair at each port, the low-current performance of each pair being improved without requiring the use of large resistors. Each of the two voltage-to-current converters includes a difference amplifier with feedback. The output stage of the converter is a complementary pair with the PNP transistor functioning as a constant current source and the NPN transistor being driven in accordance with the output of the difference amplifier. This requires level shifting but greatly improves the high frequency performance.

INVENTOR.
JOHN MATARESE
BY Amster & Rothstein
ATTORNEYS

INTEGRATABLE GYRATOR

INTEGRATABLE GYRATOR

This invention relates to gyrators and more particularly to semiconductor gyrators for simulating high Q-inductors which can be manufactured by standard silicon monolithic integrated circuit techniques.

The gyrator is a nonreciprocal two-port network with an admittance matrix $$\begin{bmatrix} 0 & g_1 \\ -g_2 & 0 \end{bmatrix}$$

where $g_1$ and $g_2$ are the gyrator transconductances. It was first proposed and described by B. Tellegen in an article entitled "The Gyrator, a New Electric Element" in Philips Research Report, 1948, pp. 81—101. The gyrator has the property that an admittance $y$ connected to one port is transformed into an impedance $y/g_1g_2$ presented at the other port; consequently, a capacitance $C$ can be transformed into an inductance $L=C/g_1g_2$.

A two-port network having the admittance matrix of a gyrator can be implemented with the use of two voltage-to-current converters. Each port has two input terminals; typically, one terminal of each port is grounded. A first converter is connected in one direction between the remaining two terminals, one in each port, and the second converter is connected between the same two terminals but in the opposite direction. The two converters have respective phase shifts of 0° and 180°. For the two voltage-to-current converters to provide the ideal gyrator admittance network, it is necessary that each converter have infinite input and output impedances.

Two general approaches have been taken to maximize the input impedances (to the order of megohms). The first technique used in the prior art was to provide a pair of transistors arranged in a Darlington configuration at the input of each converter. A Darlington pair has a very high input impedance. However, it was found that a gyrator used to convert a capacitor across the output port to an inductor across the input port, and which was designed to realize a Q-factor in the order of several hundred, became unstable at frequencies in the order of a few tens of kiloHertz. As described in U.S. Pat. No. 3,400,335 issued to H. J. Orchard et al. on Sept. 3, 1968, this instability arose due to phase shifts, particularly phase shifts in the input stage of each converter when this stage included bipolar transistors.

The second approach taken in the prior art to realize a high input impedance for each converter, as described in the above-identified Orchard et al. patent, was to eliminate the Darlington input circuit in each converter and to use instead a metal-oxide semiconductor field-effect transistor (MOSFET). Such a transistor has a very high input impedance and with it stable gyrators can be designed which are suitable for use at frequencies as high as 100 kHz. (The basic gyrator circuit itself does not provide a stable operation at frequencies this high, but capacitor compensation circuits can be provided internally for increasing the upper frequency.) One problem with this approach, however, is that it is exceedingly difficult to fabricate bipolar and MOS transistors on the same substrate.

It is a general object of this invention to provide a gyrator circuit which can be made exclusively of bipolar transistors with standard silicon monolithic techniques, which includes a Darlington pair at the input of each voltage-to-current converter and which is capable of stable operation at frequencies in excess of those obtainable even with gyrators having field-effect transistors at their inputs. More specifically, it is an object of this invention to provide a gyrator with a Q-factor of 250 up to 100 kHz. without internal capacitive compensation, and the same Q-factor up to 1 MHz. with internal capacitive compensation.

In most cases, it is desireable to operate a gyrator over a frequency range extending to DC; conventional gyrator circuits therefore include DC stages. This requires that the output stage of each converter, in addition to offering a very high impedance to the connected port, also be maintained at a ground quiescent voltage. A typical prior art output stage includes a pair of complementary bipolar transistors, such as those shown in the above-identified Orchard et al. patent. If the gyrator is to be made on a single substrate, this requires that both NPN and PNP transistors be formed. Most of the transistors made by present-day standard silicon monolithic techniques are of the NPN type. Although various types of PNP transistors can be formed on the same substrate, they either require additional processing steps and are therefore more costly, or are of inferior quality particularly with respect to their gain and frequency response.

Typically, in a prior art gyrator the NPN transistor in each complementary pair functioned as a constant current source and the PNP transistor was driven from a DC amplifier in the respective voltage-to-current converter. This necessarily degraded the performance in the case of a low-quality PNP transistor but was accepted due to the fact that the quiescent output voltage of the DC amplifier had a polarity compatible with the drive requirements of the PNP transistor only.

It is another object of my invention to provide a complementary pair of bipolar transistors in the output stage of each converter, without degrading the frequency response of the gyrator as a result of the use of low-quality PNP transistors on a substrate which for the most part contains NPN transistors. More specifically, it is an object of my invention to utilize the PNP transistor in a manner independent of the input voltage to the respective converter.

Another problem encountered in the design of prior art gyrators is that of limited dynamic range. The admittance matrix for an ideal gyrator has two transconductances which are independent of input amplitude. In actual practice, however, a gyrator does not operate linearly for large amplitude inputs. In a typical gyrator, both positive and negative voltage supplies are provided. (With the use of a complementary pair in each converter output stage, and the requirement of a zero quiescent level and output swings in either direction, it is necessary to use two opposite polarity sources.) The dynamic range of the gyrator is obviously limited by the magnitudes of the supplies. But in prior art gyrators the dynamic range generally has been limited to an even greater extent, primarily due to the quiescent voltage levels selected for the various active elements.

It is another object of my invention to maximize the dynamic range of a gyrator.

Each of the transconductances which characterizes a prior art gyrator is typically dependent upon various elements in a respective one of the two voltage-to-current converters. In fact, equations for the transconductances have been given in the literature which are exceedingly complex and are dependent upon numerous resistances and the characteristics of the various transistors in each converter. These complex equations require considerable effort in the selection of component values for any given design in order to achieve particular transconductance values.

It is another object of my invention to provide a gyrator in which each of the transconductance parameters is determined solely by a single resistor in the respective voltage-to-current converter.

The improved frequency response of a gyrator constructed in accordance with the principles of my invention is achieved partly due to the use of a Darlington pair at the input of each voltage-to-current converter. While in the prior art the use of such a Darlington pair was responsible for the poor frequency response and led to the use of field-effect transistors, I have found that the frequency response of a gyrator, with a Darlington pair at the input of each converter, can be improved over that possible with field-effect transistors by providing a relatively large resistor in the emitter circuit of the transistor of the Darlington pair whose base is coupled to the input port. However, in a typical integrated circuit a resistor requires more area than a transistor and it is generally preferred to use active elements wherever possible in lieu of resistances. Also, the bandwidth of an integrated circuit usually falls off if large resistances are used because the stray capacitances in the circuit have a greater effect on the frequency response. For these reasons, in accordance with the principles of my invention, the emitter quiescent current is derived with the use of an additional active element together with a resistance of relatively low magnitude. This configuration also makes the gyrator far less sensitive to temperature changes.

The input stage of each voltage-to-current converter of my invention includes a difference amplifier. The amplifier is provided with feedback; one of the two inputs to the difference amplifier is connected to an associated one of the two gyrator ports, and the other input to the difference amplifier is connected to an amplifier output. This arrangement improves both the frequency response and the dynamic range of the gyrator The output stage of each voltage-to-current converter includes a complementary pair of transistors. Actually, the PNP transistor is associated with an NPN transistor for improving the performance of the former. Nevertheless, the frequency characteristic of the combination is not as good as that of an NPN transistor, and for this reason the PNP composite transistor is used only as a constant current source. The NPN transistor in the complementary pair serves to control the amount of current delivered by the constant current source (PNP composite transistor) to the impedance connected to the associated port. In other words, the PNP composite transistor provides a constant current which is divided between the impedance connected to the associated port and the NPN transistor in the complementary pair. The input voltage to each converter controls the amount of current which flows through the NPN transistor, and the balance necessarily flows through the impedance connected to the associated port. In this manner, the frequency characteristics of the PNP composite transistor have a minimal effect on the frequency response of the overall gyrator.

The dynamic range of the gyrator is maximized by judiciously choosing a bias voltage for the NPN transistor in the complementary pair which is approximately two-thirds of the magnitude of either voltage source (the two voltage sources have equal magnitudes in the illustrative embodiment of the invention). The two design objectives of driving the NPN output transistor by the output of the difference amplifier and yet maintaining its base at a quiescent level which allows maximum dynamic range would appear to be incompatible in a gyrator which includes DC stages. However, in accordance with the principles of my invention, various transistors in the circuit are arranged to function as Zener diodes for lever-shifting purposes in order to achieve both of the desired objectives.

In the illustrative embodiment of the invention, each of the voltage-to-current converters includes an amplifier at the input having a gain of unity and a single NPN transistor at the output which serves to convert the amplifier output voltage to a proportional current. The input voltage and output current are related to each other solely by the magnitude of a single resistor in the emitter circuit of the output NPN transistor. Thus, each of the transconductances in the admittance matrix is governed solely by the value of a single resistor.

It is a feature of my invention to provide a Darlington pair at the input of each voltage-to-current converter in a gyrator for achieving a high input impedance, each Darlington pair having a resistor and an active element for improving the performance of the overall system.

It is another feature of my invention to provide a difference amplifier with feedback at the input of each voltage-to-current converter, one input of the difference amplifier being coupled to an associated port and the other input being coupled to an output of the amplifier.

It is another feature of my invention to provide a complementary transistor pair in the output stage of each voltage-to-current converter, the PNP transistor in each pair serving as a constant current source and the NPN transistor in each pair serving to convert the input voltage to an output current with a transconductance parameter determined solely by a resistor included in the emitter circuit of the NPN transistor.

It is another feature of my invention to bias the NPN transistor in the output stage of each voltage-to-current converter for maximum dynamic range and to drive the base of the transistor in accordance with the output voltage of the difference amplifier through a level-shifting network.

Further objects, features and advantages of my invention will become apparent upon a consideration of the following detailed description in conjunction with the drawing, in which.

Figure 1:
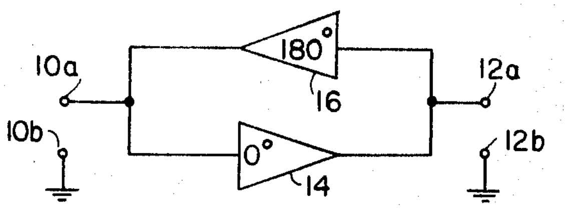
FIG. 1 is a block diagram of a basic gyrator system.

Referring to the basic gyrator system depicted in FIG. 1, one port includes terminals 10*a*, 10*b* and the other port includes terminals 12*a*, 12*b*. Terminals 10*b*, 12*b* are grounded. Between terminals 10*a*, 12*a* are two oppositely phased voltage-to-current converters 14, 16 connected in parallel in opposite directions. Assuming that some network is placed across each port, and further assuming that each converter has infinite input and output impedances, it can be shown that the current flowing through the first external network from terminal 10*b* to terminal 10*a* is equal to the potential difference between terminals 12*a*, 12*b* multiplied by a factor $g_1$. Similarly, the current flowing through the second network from terminal 12*b* to terminal 12*a* is eqaual to the potential difference between terminals 10*a*, 10*b* multiplied by a factor $-g_2$. It can further be shown that if a capacitance $C$ is placed across terminals 12*a*, 12*b* (the output port), then the impedance seen looking into terminals 10*a*, 10*b* (the input port) is an inductance of value $C/g_1g_2$.

The uppermost voltage-to-current converter is shown as having a phase shift of 180°. This is interpreted as follows: If terminal 12*a* goes positive with respect to terminal 12*b*, then increased current flows in the direction from terminal 10*b* to terminal 10*a*. (This would have the effect, were a resistor placed across terminals 10*a*, 10*b*, of causing terminal 10*a* to go negative with respect to terminal 10*b*—a phase shift of 180° relative to the initial voltage change across terminals 12*a*, 12*b*.) The 0° phase shift of converter 14 is interpreted in the converse manner: If terminal 10*a* goes positive with respect to terminal 10*b*, then current flows through an impedance connected to the output port in the direction from terminal 12*a* to terminal 12*b*.

Figure 2:
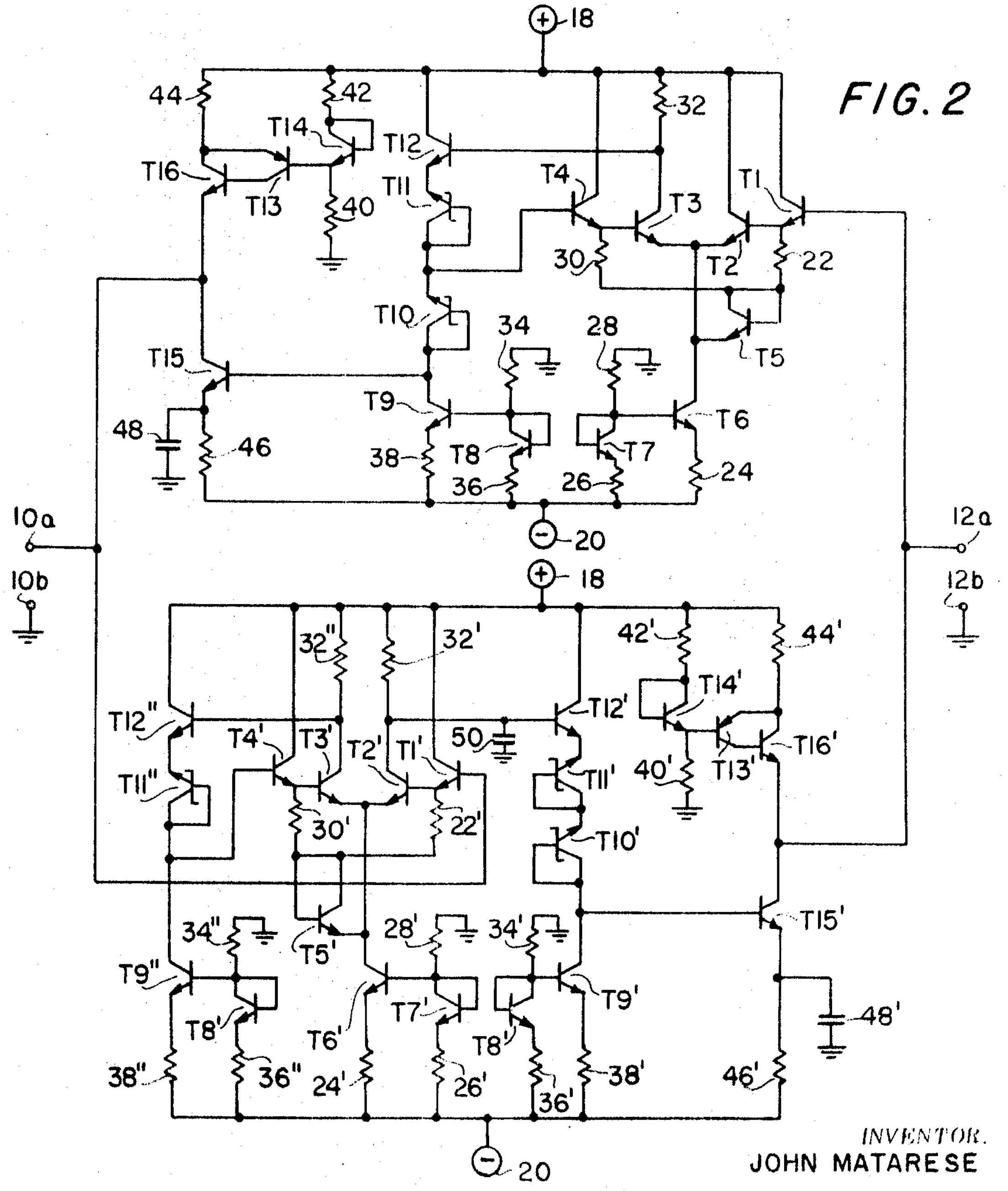
FIG. 2 is an illustrative circuit diagram of a gyrator designed in accordance with the principles of my invention.

The circuit of FIG. 2 is arranged to correspond to the block diagram of FIG. 1. The same numerals are used for the two ports. If an imaginary line is drawn between terminals 10*a*, 12*a*, the circuitry above the line corresponds to converter 16 in FIG. 1 and the circuitry below the line corresponds to converter 14 in FIG. 1.

The operation of the circuit of FIG. 2 can be best understood by first considering the uppermost voltage-to-current converter. The input stage of the converter includes a difference amplifier having four NPN transistors T2, T3, T6 and T7. The emitters of transistors T2 and T3 are connected to each other and to the collector of transistor T6. Transistors T6 and T7 serves as a constant current source, as will be described below. Assuming that the base voltages of transistors T2, T3 are equal, the current through transistor T6 will divide equally between transistors T2, T3. Although transistor T3 includes a collector resistor 32 while transistor T2 is connected directly to positive potential source 18, the provision of only a single collector resistor does not affect the equal division of current between the two transistors. The collector-emitter voltage across a transistor does not affect substantially the current through it, the emitter current being determined for the most part by the base current.

If the base voltage of transistor T2 increases relative to the base voltage of transistor T3, the base-emitter junction of transistor T2 will be more forward biased than the base-emitter junction of transistor T3. Transistor T2 will thus conduct more than half of the total current through transistor T6. With less than half of the total current flowing through transistor T3, there is less of a voltage drop across collector resistor 32 and the collector of transistor T3, the output of the difference amplifier, rises toward the potential of source 18. On the other hand, if the base of transistor T2 goes negative with respect to the base of transistor T3, more current must flow through transistor T3 and its collector goes negative relative to the quiescent level. It can be shown that the change in voltage from the quiescent level at the collector of T3 is proportional to the difference between the voltage at the base of transistor T2 and the voltage at the base of transistor T3. For small voltage differences the difference amplifier operates linearly, that is, the T3 collector voltage changes in direct proportion to the difference in the two base voltages.

Transistor T7 causes transistor T6 to serve as a constant current source. The collector of transistor T7 is connected directly to the base of the transistor. The base-emitter voltage of the transistor is approximately 0.6 volt independent of the current flowing through the transistor. Consequently, the current flowing through resistors 26, 28 and transistor T7 is determined by the magnitude of negative source 20 and the magnitudes of the two resistors. Since the base of transistor T6 is connected to the base of transistor T7, and the base-emitter drop across transistor T6 is the same as that across transistor T7, the emitters of the two transistors are at the same potential. If resistor 24 has the same magnitude as resistor 26, equal currents will flow through the two transistor circuits. The current through transistor T7 and resistor 24 is determined solely by the circuit of transistor T7. (The base of transistor T6 draws a negligible current compared to the collector or emitter currents, and the two transistor currents can therefore be considered to be the same.) The current through transistor T6 serves as the constant current source for the difference amplifier.

In the illustrative embodiment of the invention, resistor 24 has a magnitude of 390 ohms (the various component values are given below). It is possible to construct a difference amplifier with a single resistor connected between the junction of the emitters of transistors T2, T3 and negative source 20. However, in such a case a relatively large resistance would be required and in integrated circuit design it is preferred not to use such large resistances. For this reason, a transistorized constant current source is provided to permit the use of a small resistance 24.

Transistor T7 serves in the capacity of a diode; coupling the collector to the base of the transistor causes the device to function more ideally as a diode. In the fabrication of an integrated circuit it is customary to construct transistors wherever active devices are necessary and then to make the collector-base connection where a diode is required.

The input stage of the uppermost voltage-to-current converter includes a Darlington pair comprising transistors T1, T2 (transistor T2 is part of both the Darlington pair and the difference amplifier). The input voltage, that is, the voltage across the port defined by terminals 12*a*, 12*b*, appears at the base of transistor T1. Ordinarily, in a Darlington pair the emitter of the first transistor is coupled to the base of the second (as in FIG. 2) with no additional connection to the first emitter. The base of the first transistor draws very little input current. The current at the emitter of the second transistor is equal to the input current multiplied by the base-emitter current gains of both transistors. There is thus large current amplification without a significant input current flowing, and the Darlington pair presents a relatively large input impedance.

As described above, Darlington pairs are not preferred for use in gyrators at the present time because they introduce a temperature dependent phase shift into the overall system which results in a limited frequency range. The phase shift is due to variations in the forward current transfer ratio ($\beta$) of the input transistor in the pair. The parameter is not constant and instead is a function of temperature. Transistors T1, T2 provide one-half of the constant current flowing through transistor T6 in the quiescent condition. The current gain of the two transistors is appreciable and thus if the constant current through transistor T6 is measured in milliamperes, the base current of transistor T1 may be in the order of microamperes. But with very small values of base current, the $\beta$ of transistor T1 falls quite low. One of the main advantages of using a Darlington pair in the first place is that the input impedance is very high because the two transistors provide a significant current gain. But if the $\beta$ of the first transistor goes down, this advantage is lost, the input impedance of the converter is not as high as otherwise possible, and there is an adverse effect on the high frequency performance. Furthermore, the $\beta$ of the first transistor varies with temperature and thus the overall system is temperature sensitive.

However, consider the connection of an additional resistor between the emitter of transistor T1 and the emitter of transistor T2. In such a case, it can be shown that the transistor pair has a better frequency response. However, a large magnitude resistor would be required. In order to utilize a relatively small value of resistance, resistor 22 is connected from the emitter of transistor T1 to the base of transistor T5. The collector and base of transistor T5 are shorted together and thus transistor T5 functions as a diode. Transistor T2 draws more current than transistor T5 because the current through transistor T5 is derived from the relatively small emitter current of transistor T1 and the current through transistor T2 is amplified by the factor $\beta$ of transistor T2. With more current flowing through transistor T2 than transistor T5, the base-emitter drop of transistor T2 is greater than that of transistor T5. There is thus a small potential difference across resistor 22 which equals the difference between the base-emitter voltages of transistors T2 and T5. Even if this difference is as small as 0.1 volts, resistor 22 can have a magnitude as low as 1,000 ohms for 100 microamperes to flow through it. This current is sufficient to stabilize transistor T1 even though resistor 22 is of relatively small magnitude.

Just as transistor T1 feeds transistor T2, the latter being one of the active elements in the difference amplifier, transistor T4 feeds transistor T3 to preserve the symmetry of the difference amplifier. Although the symmetry of operation of a difference amplifier is not affected by the collector resistors, it is affected by the base and emitter circuit connections. For the same reason, the emitter of transistor T4 (base of transistor T3) is also connected through a resistor 30 to transistor T5, resistors 30 and 22 being of equal magnitudes.

Difference amplifiers themselves have been incorporated in many prior art systems, including gyrators. In a typical gyrator incorporating a difference amplifier, the base of transistor T4 would be grounded. Assuming a quiescent voltage of zero at the base of transistor T1, the output of the difference amplifier, i.e., the collector voltage of transistor T3, would be proportional to a change in the input voltage at the base of transistor T1, going positive or negative with the input voltage. The voltage at the collector of transistor T3 is used in the output stage of the converter, as will be described below, to derive a current proportional to the input voltage. However, rather than to ground the base of transistor T4, the other input of the difference amplifier, feedback is provided between the collector of transistor T3 and the base of transistor T4. The output of the difference amplifier is fed back to one of the inputs, for various reasons to be described below.

Transistors T8, T9 and resistors 34, 36, 38 form a constant current source which is similar in operation to the constant current source which includes transistors T6, T7. The constant current through transistor T9 flows through transistors T10, T11, and T12. A connection is made between the collector and base of each of transistors T10 and T11. The voltage drops across the collectors and emitters of these transistors are such that each transistor functions as a Zener diode, the emitter of each transistor being positive with respect to the collector. Typically, the drop for an integrated circuit transistor is 7.5 volts. Assuming that the base-emitter voltage of transistor T12 is 0.6 volts, resistor 32 is selected such that the collector voltage of transistor T3 in the quiescent state is 8.1 volts. In the quiescent state, where the input voltage at the base of transistor T1 is 0, the collector of transistor T3 is at 8.1 volts, and there is a 0.6-volt drop across the base-emitter junction of transistor T12 and a 7.5-volt drop across the emitter-collector circuit of transistor T11. Thus the collector of transistor T11 is at ground potential as is the base of transistor T4 which is connected directly to it. The voltage drop across transistor T11 (a Zener diode) allows the collector of transistor T3 to be coupled directly back to the base of transistor T4 even though they are at different quiescent levels. The constant current source T9 determines the current through transistors T10, T11 and causes them to function as Zener diodes. Transistor T12 is provided for isolation purposes so that little current is drained from the difference amplifier to the feedback network. Actually, I have found that transistor T12 can be omitted and the collector of transistor T3 can be connected directly to the emitter of transistor T11. In such a case, the current for transistors T10, T11 would flow through resistor 32.

Even with transistor T12 in the circuit, however, the emitter voltage of the transistor follows the base voltage. Since the voltage drop across transistor T11 is constant, it is apparent that the voltage at the base of transistor T4 follows changes in the voltage at the collector of transistor T3.

It should be noted that all of the difference amplifier output voltage is fed back to the difference amplifier input at the base of transistor T4. It would be possible to feed back only a fraction of the output voltage. It can be shown that the voltage gain of the difference amplifier increases when only a fraction of the output voltage is fed back to the input. It is preferable that the gain be unity and it is for this reason that the whole output voltage is fed back to the input which would otherwise be grounded. The overall voltage-to-current converter functions to convert a voltage input to a current output. There is no need for internal voltage amplification. In fact, unity gain contributes to the optimization of the dynamic range because larger input voltages are required before the various active elements saturate. With unity gain it is apparent that any increase in the input voltage at the base of transistor T1 results in an identical voltage increase at the collector of transistor T3 and the base of transistor T4. But the emitter voltage of transistor T4 follows the base voltage, and since the emitter of transistor T4 is connected to the base of transistor T3 the voltage at the base of transistor T3 similarly follows the input. Large variations in input voltage are possible without any of the various transistors in the circuit saturating. The feedback (full or only partial) also contributes to improved high frequency performance.

The output stage of the voltage-to-current converter includes a complementary pair of transistors, T13 and T16 acting as a composite PNP transistor, and NPN transistor T15. Transistor T14 functions as a diode and the current through it is determined by the magnitudes of resistors 40, 42. The potential at the emitter of transistor T14 is fixed, and since it is connected to the base of transistor T13 (the base of the composite PNP transistor), transistors T13, T16 function as a constant current source. Current flows from source 18 through resistor 44 and the composite PNP transistor to the collector of transistor T15.

Transistor T16 is placed across transistor T13 to increase its effective $\beta$. As described above, on a substrate which contains for the most part NPN transistors, it is very difficult to make high-quality PNP transistors. To improve the effective $\beta$ of transistor T13 (typically, it has a value close to unity), transistor T16 is placed across it as is known in the art. The combination of the two transistors still exhibits the characteristics of a PNP transistor but the effective $\beta$ is approximately equal to the $\beta$ of NPN transistor T16. The fact that the quality of transistor T13 is not high is of little importance in my invention. Transistors T13, T16 serve as a constant current source and the current through them does not change as the input voltage varies. This is to be distinguished from the prior art in which the PNP transistor in the complementary pair in the output stage of each voltage-to-current converter was driven in accordance with changes in the input voltage.

The various resistors are selected such that in the quiescent condition, when the input voltage at the base of transistor T1 is at ground potential, the junction of the emitter of transistor T16 and the collector of transistor T15 (terminal 10*a*) is similarly at ground potential. Suppose that the input voltage increases and that this results in a voltage increase at the base of transistor T15 (this operation will be described below). In such a case, a larger current flows through transistor T15. Since the current through transistors T13, T16 is constant and more current now flows through transistor T15, it is apparent that additional current must flow from the terminating circuit connected to terminal 10*a*. There is a one-to-one correspondence between the increased current through transistor T15 and the increased current from terminal 10*a*. Resistor 46 is connected between the emitter of transistor T15 and negative source 20, and the emitter voltage of the transistor follows the base voltage. All input voltage changes appear across resistor 46 and consequently resistor 46 determines the current change through transistor T15 for any change in the input voltage. Since the current through terminals 10*a*, 10*b* changes by the same amount, it is apparent that the magnitude of resistor 46 is solely determinitive of the change in output current for any change in input voltage. The transconductance factor $g_1$ in the gyrator admittance matrix is simply 1/R where R is the magnitude of resistance 46.

For maximum dynamic range, and assuming that the magnitude of each of positive and negative sources 18 and 20 is 12 volts, the quiescent voltage at the base of transistor T15 should be approximately −8 volts (neglecting for the moment the base-emitter drop of transistor T15). Assume that the input voltage goes negative. The base and emitter of transistor T15 go negative, and it is apparent that the emitter of transistor T15 can go no more negative than −12 volts since that is the magnitude of source 20. Consequently, the maximum negative swing possible at the base of transistor T15 (assumed to be the input voltage) is −4 volts. Assume now that the input voltage goes positive. With a greater amount of current flowing through transistor T15, the collector of the transistor goes negative in potential. The output voltage at terminal 10*a* thus starts to go negative. The limiting condition is where the base voltage has increased in the positive direction to the point where the two voltages are equal; the transistor ceases to operate. The collector voltage change is dependent upon the impedance of the circuit connected across terminals 10*a*, 10*b*. A convenient condition is to assume that the impedance across terminals 10*a*, 10*b* is equal to the impedance of resistor 46. In such a case, the base voltage goes positive by the same amount that the collector voltage goes negative. Thus the maximum change in the base voltage is 4 volts because at that point the base is at −4 volts and so is the collector. If the base goes more positive (and the collector more negative) there will no longer be a reverse bias across the base-collector junction and the transistor will cease to conduct.

This analysis shows that with the collector of transistor T15 at a quiescent voltage of zero, the base should be at a level equal to two-thirds of the negative supply. The analysis is theoretical only, however, because it assumes no drop across the base-emitter junction and a base-collector cutoff voltage of zero. In actual practice, the base voltage should depart slightly from two-thirds of the supply voltage. In general, when it is stated that the base voltage should equal two-thirds of the supply voltage it is to be understood that this can actually vary by as much as ±10 percent. In the circuit of FIG. 2, the quiescent base voltage in −7.5 volts, equal to the drop across Zener diode T10. It is the drop across this diode which in every case establishes the base voltage of transistor T15. The nominal magnitudes of the supply voltages should be selected to be 50 percent greater than the base voltage.

This requirement of −7.5 volts at the base of transistor T15 does not permit the base of transistor T15 to be driven directly from the output of the difference amplifier since the collector of transistor T3 is at a quiescent level of +8.1 volts. However, it will be recalled that the collector of transistor T11 is at a quiescent level of zero and follows changes in the input voltage about this level. There is another 7.5-volt drop across transistor T10 which is arranged in a Zener diode configuration. Thus, the collector of transistor T10 is at a quiescent level of 7.5 volts and the voltage at the collector of the transistor similarly follows changes in the input voltage. Thus, the full change in the input voltage is applied to the base of transistor T15 as assumed above in connection with the description of the output stage of the voltage-to-current converter.

The voltage-to-current converter in the lower half of FIG. 2 is very similar to that in the upper half except that it is the voltage at terminal 10*a* which is converted to a current between terminals 12*a*, 12*b*. The major difference between the two voltage-to-current converters is that the phase shifts are in opposite directions. In connection with the lower converter, if terminal 10*a* goes positive an increased current flows through the terminating impedance connected from terminal 12*a* to terminal 12*b*.

The various elements in the lower converter are designated by the same numerals as the corresponding elements in the upper converter except for the use of prime symbols. Thus, for example, transistors T2′, T3′ form a difference amplifier similar in operation to the difference amplifier including transistors T2, T3. However, there are a number of changes in the lower converter as a result of the different phase shift requirement.

The input to the lower converter is at the base of transistor T1′. However, the output is now taken at the collector of transistor T2′, rather than at the collector of transistor T3′. Since the two outputs of a difference amplifier are of opposite phases, it is apparent that the collector of transistor T2′ goes negative when the base of transistor T1′ goes positive. The collector of transistor T2′ is now returned through a resistor 32′ to positive source 18, rather than directly to the source as in the case of the upper converter, in order to develop an output voltage. (Since there are two collector resistances in the difference amplifier in the lower converter, they are represented by the numerals 32′, 32″.) The output stage including transistors T13′—T16′ is identical to the output stage in the upper converter. Similarly, in order to drive transistor T15′ from the output of the difference amplifier it is necessary to shift the quiescent level. This is achieved with the use of the constant current source formed by transistors T8′ and T9′, Zener diodes T10′ and T11′, and isolating transistor T12′.

The feedback for the difference amplifier in the lower converter is the same as that in the upper converter. Referring to the upper converter, the signal transmitted through transistor T12 is extended to both the base of transistor T4 and the base of transistor T15. In the lower converter, however, it is the signal at the collector of transistor T2′ which serves to drive transistor T15′ rather than the signal at the collector of transistor T3′. Since the feedback for the lower converter is the same, there are two transistors T12′, T12″ for extending the signals at the collector of each of transistors T2′, T3′ to the base of either transistor T15′ or T4′. With respect to transistor T15′, it is necessary to provide Zener diodes T10′, T11′ in order to couple the signal at the collector of transistor T2′ to the base of transistor T15′ which is at a quiescent level of −7.5 volts. With respect to the signal extended to the base of transistor T4, it should be noted that in the upper converter only transistor T11 is required for the proper level shifting. Transistor T10 is required for an additional level shift to couple the output signal to the base of transistor T15. In the lower converter, transistor T11″ is provided in a Zener diode configuration to shift the 8.1-volt level at the collector of transistor T3′ to the zero level at the base of transistor T4′. There is no need for an additional transistor T10″ for level shifting purposes, however, since the signal at the collector of transistor T3′ is not extended to an output stage. The collector-emitter voltage across transistor T9″ is greater than that across transistor T9. But, as discussed above, the collector-emitter voltage of a transistor has little effect on its conduction for any given base current.

It will be recalled that each output stage limits the input dynamic range to approximately ±4 volts (the maximum possible value). The same is true of each input stage. This is highly desirable since, were the range limited to a greater extent by the input stages, the increased range allowed by the output stages would be of no use. The limiting transistor, as far as the input stages are concerned, is transistor T2′. Neglecting base-emitter drops, the base of transistor T2′ is at 0 volts in the quiescent condition. The collector is approximately at +8 volts. The input voltage at the base of transistor T1′ (T2′) should go no more negative than −4 volts since for this input the collector of transistor T2′ rises from +8 volts to +12 volts, the maximum possible value for the collector voltage. Similarly, a positive input voltage of +4 volts drives the base of transistor T2′ to +4 volts, and the collector from +8 volts to +4 volts—the limiting condition for the reverse bias across the base-collector junction. Thus it is apparent that for maximum dynamic range the outputs of the difference amplifiers should be held at quiescent potentials approximately equal to two-thirds of the positive supply voltage.

If a capacitor is placed across terminals 12*a*, 12*b* the impedance seen looking into terminals 10*a*, 10*b* is inductive. Suppose that another (test) capacitor is placed in series between terminal 10*a* and an input source and the Q of the effective inductance is measured at the resonant frequency. As the test capacitor is varied, the resonant frequency changes. For each value of the test capacitor, if the Q of the effective inductance of the gyrator circuit is measured, it is found that the Q-curve increases as the frequency increases until a peak is reached, at which point it starts to decrease. The peak is actually achieved when the test capacitor equals the capacitance placed across terminals 12*a*, 12*b*. If now a smaller capacitor is placed across terminals 12*a*, 12*b* (resulting in a smaller effective gyrator inductance), it is found that the entire curve shifts to the right. Again, the peak Q is reached when the test capacitor equals the capacitor across terminals 12*a*, 12*b*. Yet it is found that the peak value of Q is the same. If the envelope of the peaks of the various curves is drawn, the resulting plot is a horizontal line.

However, this is true only up to a certain limit. As the frequency increases beyond a certain point the curve starts to rise quite rapidly. This means that the system becomes unstable for high frequencies. Although high Q's are desirable, if the effective Q is too high the system becomes unstable—random thermal signals, for example, result in oscillations.

In the prior art, capacitors have been included in each voltage-to-current converter to extend the Q-curve out to higher frequencies before it starts to grow out of proportion. Capacitors 48, 48′ are provided for this purpose. Each of these capacitors serves as a high-frequency-peaking circuit and extends the useful frequency range. In the prior art, the use of such capacitors have extended the performance of gyrators up to 100 kHz. The gyrator of FIG. 2 performs satisfactorily without compensating capacitors up to 100 kHz., and with compensation up to 1 MHz. Either or both of capacitors 48, 48′ can be used to extend the frequency range.

On the other hand, there are times when it is desirable to cause the Q-curve to start rising at lower frequencies. For example, if a higher Q is desired at a specific relatively low frequency, it can be achieved by shifting the Q-curve to the left so that the rising portion will be at the frequency of interest. Of course, if the Q-curve is shifted too much the resulting Q will be so high as to make the system unstable. Thus, the Q-curve should be shifted just enough to give the desired Q without causing the system to become unstable. The Q-curve can be shifted toward the lower frequencies by including capacitor 50 between the base of transistor T12′ and ground as shown in FIG. 2. The capacitor introduces a small amount of phase shift in the circuit so as to degrade the frequency characteristic, i.e., to shift the Q-curve toward the lower frequencies. The base of transistor T12′ is a convenient point in the circuit to connect capacitor 50; the capacitor must be placed in the AC signal path and placing it at the base of transistor T12′ results in the greatest shift in the Q-curve for a capacitor of any given value. It is not as preferred to use a similar capacitor at the base of transistor T12 because such a capacitor would also affect the feedback in the difference amplifier circuit. However, transistor T12' is not involved in the feedback in the lower converter and thus the base of transistor T12' is a convenient place for introducing a phase shift.

The following are the component values used in the circuit of FIG. 2 which produce a Q of 250 up to 100 kHz. with no compensation (with potential sources having magnitudes of 12 volts):

| Resistor | Ohms |
|---|---|
| 22 (22') | 1,000 |
| 30 (30') | 1,000 |
| 32 (32') (32'') | 1,200 |
| 24 (24') | 390 |
| 36 (36') (36'') | 390 |
| 38 (38') (38'') | 390 |
| 34 (34') (34'') | 11,000 |
| 40 (40') | 1,600 |
| 42 (42') | 1,000 |
| 44 (44') | 1,000 |
| 46 (46') | 1,000 |

Although the invention has been described with reference to a particular embodiment, it is to be understood that this embodiment is merely illustrative of the application of the principles of the invention. For example, it has been assumed that most of the transistors used in the gyrator are of the NPN type, and the output stage includes one PNP transistor. It is just as feasible to use PNP transistors throughout the circuit, in which case a single NPN transistor in the output stage would be required and would exhibit poor high frequency characteristics. (In general, high-quality transistors of both types cannot be made on the same substrate.) In this case, the NPN transistor would function as a constant current source and the PNP transistor in the output stage would be driven through a level-shifting network. Thus it is to be understood that numerous modifications may be made in the illustrative embodiment of the invention and other arrangements may be devised without departing from the spirit and scope of the invention.

I claim:

1. A gyrator having first and second ports comprising:

a. a first voltage-to-current converter having an input terminal coupled to the first gyrator port and an output terminal coupled to the second gyrator port, said first voltage-to-current converter comprising:
   1. a difference amplifier having first and second input terminals and an output terminal, the first input terminal of said difference amplifier being coupled to the input terminal of said voltage-to-current converter;
   2. an output stage having an input and an output terminal, the output terminal of said output stage being coupled to the output terminal of said voltage-to-current converter;
   3. means for coupling the output terminal of said difference amplifier to the input terminal of said output stage; and
   4. feedback means coupled between the output terminal of said difference amplifier and the second input terminal of said difference amplifier;

b. a second voltage-to-current converter having an input terminal coupled to the second gyrator port and an output terminal coupled to the first gyrator port, said second voltage-to-current converter being oppositely phased from said first voltage-to-current converter, said second voltage-to-current converter comprising:
   1. a difference amplifier having first and second input and first and second output terminals, the signal appearing at the first output terminal of the difference amplifier being oppositely phased from the signal appearing at the second output terminal and from the signal appearing at the output terminal of the difference amplifier of said first voltage-to-current converter, the first input terminal of the difference amplifier being coupled to the input terminal of said second voltage-to-current converter;
   2. an output stage having input and output terminals, the output terminal of said output stage being coupled to the output terminal of said voltage-to-current converter;
   3. means for coupling the first output terminal of said difference amplifier to the input terminal of said output stage; and
   4. feedback means coupled between the second output terminal of said difference amplifier and the second input terminal of said difference amplifier.

2. A gyrator in accordance with claim 1 wherein each of said voltage-to-current converters further comprises a first transistor having its base electrode coupled to the input terminal of the voltage-to-current converter and its emitter electrode coupled to the first input terminal of the associated difference amplifier.

3. A gyrator in accordance with claim 2 wherein each of said difference amplifiers includes a second transistor having its base electrode coupled to the first input terminal of the associated difference amplifier and its emitter and collector electrodes coupled respectively to the emitter and collector electrodes of said first transistor, said first and second transistors being arranged in a Darlington circuit configuration.

4. A gyrator in accordance with claim 3 further comprising means coupled between the emitters of said first and second transistors for controlling the quiescent current flow through said transistors.

5. A gyrator in accordance with claim 4 wherein said means for controlling the quiescent current flow through said Darlington circuit comprises a series-connected resistor and unidirectional current flow device.

6. A gyrator in accordance with claim 1 wherein said output stage in each of said voltage-to-current converters comprises a constant current source and a third transistor, the collector electrode of said third transistor being coupled to said constant current source and to the output terminal of said output stage, the base electrode of said third transistor being coupled to the input terminal of said output stage and the emitter electrode of said third transistor being coupled to a terminal adapted for connection to a source of potential.

7. A gyrator in accordance with claim 6 further comprising a resistor coupled between the emitter electrode of said third transistor and the said terminal adapted to be coupled to a source of potential, the transconductance of each of said voltage-to-current converters being proportional to the magnitude of its associated resistor.

8. A gyrator in accordance with claim 7 wherein each of said voltage-to-current converters further comprises means coupled between the base electrode of said third transistor and the terminal adapted for connection to a source of potential, said means maintaining the quiescent voltage at the base electrode of said third transistor equal to approximately two-thirds of the voltage of the potential source.